United States Patent [19]

Ohnaka et al.

[11] Patent Number: 5,194,333
[45] Date of Patent: Mar. 16, 1993

[54] PACKING MATERIAL FOR REVERSED PHASE CHROMATOGRAPHY AND PROCESS FOR ITS PREPARATION

[75] Inventors: Tadao Ohnaka; Katsuo Komiya; Hiroyuki Moriyama, all of Shinnanyo, Japan

[73] Assignee: Tosoh Corporation, Shinnanyo, Japan

[21] Appl. No.: 629,625

[22] Filed: Dec. 18, 1990

[30] Foreign Application Priority Data

Dec. 18, 1989 [JP] Japan .................. 1-326172
Jul. 17, 1990 [JP] Japan .................. 2-187282

[51] Int. Cl.$^5$ ............................................. B32B 5/16
[52] U.S. Cl. ........................... 428/405; 428/429; 428/447; 210/198.2; 210/656; 427/220
[58] Field of Search ............ 428/402, 405, 447, 429; 521/91; 436/527; 528/10; 210/656, 660

[56] References Cited

U.S. PATENT DOCUMENTS

| | | | |
|---|---|---|---|
| 4,145,506 | 3/1979 | Yamamoto et al. | 528/10 |
| 4,694,092 | 9/1987 | Takahata et al. | 556/400 |
| 4,847,159 | 7/1989 | Glajch et al. | 428/447 |
| 4,920,152 | 4/1990 | Regnier et al. | 521/31 |
| 4,933,372 | 6/1990 | Feibush et al. | 521/91 |

FOREIGN PATENT DOCUMENTS

| | | |
|---|---|---|
| 0051855 | 5/1982 | European Pat. Off. . |
| 0158500 | 10/1985 | European Pat. Off. . |
| 2426698 | 12/1975 | Fed. Rep. of Germany . |
| 2039787 | 8/1980 | United Kingdom . |

*Primary Examiner*—Paul J. Thibodeau
*Assistant Examiner*—Hoa T. Le
*Attorney, Agent, or Firm*—Oblon, Spivak, McClelland, Maier & Neustadt

[57] ABSTRACT

A packing material for reversed phase chromatography, which comprises silica gel with its entire surface substantially coated with repeating units of a polycarbosilane of the formula (I):

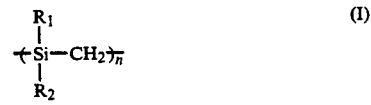

wherein $R_1$ is an octyl group, an octadecyl group or a phenyl group, $R_2$ is a methyl group or a methylene group, and n is a positive integer.

6 Claims, No Drawings

PACKING MATERIAL FOR REVERSED PHASE CHROMATOGRAPHY AND PROCESS FOR ITS PREPARATION

The present invention relates to a packing material for reversed phase chromatography and a process for its preparation. More particularly, it relates to a packing material for reversed phase chromatography characterized in that the entire surface of silica gel packing material is coated with a polycarbosilane, and a process for its preparation.

Packing materials for chromatography are classified into two types i.e. organic carriers represented by a styrene polymer and inorganic carriers represented by e.g. silica gel or alumina. Carriers of each class are widely used as packing materials for adsorption and separation. The former organic carriers have a basic structure which is chemically stable against acids or alkalis. Therefore, the pH range of the eluting solution to be used is wide as compared with silica gel carriers. Particularly, they have a merit that the packing materials can be washed with an alkaline solution This is one of the reasons why they are frequently used for the analyses of polymer substances. However, their mechanical strength is low as compared with the silica substrate, and it is therefore difficult to pulverize the particles into fine particles. Therefore, it is hardly possible to obtain a packing material for a column having a high theoretical plate number. Particularly, no adequate performance is obtainable in the separation of low molecular weight substances where a high separating ability is required. Further, they have swelling and shrinking properties depending upon the organic solvent. Therefore, it is necessary to be careful for their handling, particularly when the solvent is changed.

On the other hand, with respect to inorganic carriers, packing materials using silica gel as the base material are most commonly employed. Chemical bond type carriers having functional groups introduced to the surface by means of various silane coupling agents are widely employed. Among them, carriers having octadecyl groups, octyl groups or phenyl groups introduced are widely used as packing materials for reversed phase chromatography. In general, packing materials employing silica gel as the base material have high mechanical strength. Therefore, the particles can be made fine, and consequently it is possible to obtain a high separation ability. Further, there is no swelling or shrinkage due to the organic solvent used, and it is easy to change the solvent. Thus, they have a merit that they can be readily used also in a case where analytical conditions are to be studied.

Such chemical bond-type silica carriers can be obtained by the modification of the surface of silica gel. For example, as a common method, it is known to introduce suitable functional groups by the reaction of the silanol groups of the silica gel surface with a silane coupling agent. However, the silica gel base material is likely to be dissolved under an alkaline or strongly acidic condition. Further, in the chemical bond-type packing materials obtained by the reaction of the silanol groups of the silica gel with a silane coupling agent or a silicone resin, the bond is substantially a siloxane bond (Si-O-Si). Therefore, their use under an alkaline or strongly acidic condition is limited. This constitutes a serious drawback of packing materials employing silica gel base material.

For the analyses employing packing materials for chromatography, a packing material which is chemically more stable and which is excellent in the separation performance, is desired.

Accordingly, it is an object of the present invention to provide a packing material for reversed phase chromatography which is chemically stable and which exhibits a high separation ability.

The present inventors have found that by coating the entire surface of fine particles of silica gel carrier with a polycarbosilane having acid resistance and alkali resistance, it is possible to obtain a packing material for reversed phase chromatography which has a high separation ability and which is chemically stable with acid and alkali resistance. The present invention has been accomplished on the basis of this discovery.

Thus, the present invention provides a packing material for reversed phase chromatography, which comprises silica gel with its entire surface substantially coated with repeating units of a polycarbosilane of the formula (I):

wherein $R_1$ is an octyl group, an octadecyl group or a phenyl groups, $R_2$ is a methyl group or a methylene group, and n is a positive integer. Preferably, $R_2$ of the polycarbosilane of the formula (I) is a methyl group.

Further, the present invention provides a process for preparing such a packing material for reversed phase chromatography, which comprises treating a polysilane coated on silica gel at a temperature of from 200° to 500° C. in an inert atmosphere.

Now, the present invention will be described in further detail with reference to the preferred embodiments.

The polycarbosilane to be used in the present invention can be obtained by using a linear polysilane of the formula (II):

wherein $R_3$ is an octyl group, an octadecyl group or a phenyl group, and m is a positive integer, or a cyclic polysilane of the formula (III):

wherein $R_3$ is as defined above, and l is a positive integer.

The polysilanes to be used in the present invention can be obtained by contacting the corresponding dichlorosilane compounds with sodium metal or lithium metal as disclosed in e.g. Journal of American Chemical Society, 71, 963 (1949) or Journal of Polymer Science: Polymer Letters Edition, Vol. 21, p 819 (1983). By selecting an octyl group, an octadecyl group or a phenyl group for the side chain of the dichlorosilane compound to be employed, it is possible to optionally determine the functional groups on the surface of the silica gel finally obtained. This polysilane will have a molecular weight of from several hundreds to several hundred thousands, although the molecular weight may vary depending upon the dichlorosilane used as the starting material or the temperature or time for its preparation.

The molecular weight of the polysilane to be used in the present invention is usually from several hundreds to several ten thousands, preferably from several hundreds to several thousands. If the molecular weight is too small, the coating on the silica gel surface will be inadequate. On the other hand, if it is too large, pores of silica tend to be clogged, and it becomes difficult to maintain an adequate pore volume.

It is known that this polysilane can be converted to a polycarbosilane of the following formula (IV) by heat treatment at a temperature of from 200° to 1000° C. under atmospheric pressure or elevated pressure in an inert gas atmosphere such as nitrogen, helium or argon, or by ultraviolet ray irradiation treatment:

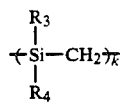
(IV)

wherein $R_3$ is as defined above, $R_4$ is a methyl group, a methylene group or hydrogen, and k is a positive integer.

The polycarbosilane contains no siloxane bond in its molecule and thus is excellent in the acid resistance and alkali resistance as compared with the chemical bond-type silica gel carriers.

The conversion to the polycarbosilane from the polysilane can be ascertained by the appearance of a peak of $Si-CH_2-Si$ having an absorption at 1355 cm$^{-1}$ by an infrared absorption photometer. Further, it can be ascertained by the nuclear magnetic resonance spectrum due to the disappearance of a peak attributable to a silicon atom of $Si-*Si-Si$ having an absorption around $-35$ to $-39$ ppm and due to an appearance of a quarternary silicon ($SiC_4$) and a tertiary silicon ($SiC_3$) having an absorption around $-0.75$ ppm and $-17.5$ ppm, respectively.

The polycarbosilane thus obtained by the rearrangement reaction of the polysilane on the silica gel constitutes a polymer substance having various side chains such as linear or cyclic hydrocarbon groups or phenyl groups on the backbone chain $-Si-CH_2-Si$. Further, at the time of rearrangement, hydrosilane groups (Si—H) also form. Therefore, by an addition reaction with a suitable alkene, further functional groups can be introduced after the rearrangement, as shown by the following formulas.

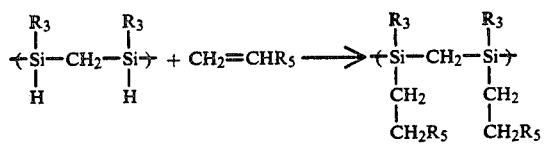

wherein $R_3$ is as defined above, and $R_5$ is an alkyl group.

As the carrier for the present invention, inorganic powders of e.g. silica gel, alumina and titania may all be used. However, silica gel is most preferred from the view point of the technique for pulverizing spherical powder into fine particles and the control of the pore size.

In the case of a silica gel carrier, the particle size is usually 1 to 100 μm, preferably from 2 to 30 μm. If the particle size is too large, high separation ability can not be obtained, and if it is too small, the back pressure at the time of packing is likely to be high, and in some cases, it becomes difficult to obtain a packed column having an adequate separation ability.

Silica gel has fine pores in its particles. In the case of the silica gel to be used in the present invention, the pore size is usually from 20 to 10000 Å, preferably from 30 to 5000 Å. If the pore size is too small, substantial coating with a polysilane tends to be difficult, and if the pore size is too large, the mechanical strength of the silica gel deteriorates, whereby it becomes difficult to obtain fine particles.

In order to uniformly coat the polysilane on silica gel, the polysilane is dissolved in a suitable organic solvent, and silica gel having trimethylsilyl groups introduced by trimethylsilyl chloride, is dispersed therein, followed by removal of the organic solvent under reduced pressure. The silica gel coated with the polysilane is deaerated under reduced pressure and then subjected to heat treatment in an inert gas for from 4 to 10 hours. The organic solvent useful for dissolving the polysilane includes, THF, chloroform, hexane, benzene, toluene and xylene. Preferred is a low boiling point organic solvent which can readily be distilled off under reduced pressure. As the inert gas, nitrogen, helium or argon may, for example, be employed.

The polycarbosilane rearranged and polymerized by the heat treatment, is insoluble in an organic solvent such as methanol or acetonitrile and therefore can be used adequately as a carrier for chromatography. Further, at the time of the conversion of the polysilane to the polycarbosilane on the silica gel, it is possible to prevent detachment of the polycarbosilane by preliminarily introducing various functional groups to the silica gel surface to reinforce the bond between the polycarbosilane and the silica gel carrier. For example, it is possible to use a carrier having short chain alkyl groups such as methyl groups or ethyl groups, or alkenyl groups such as vinyl groups or allyl groups introduced by using the corresponding silane coupling agent.

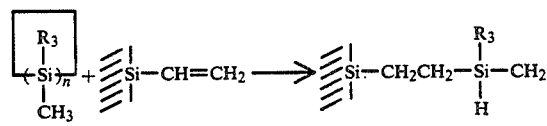

wherein $R_3$ and n are as defined above.

Now, the present invention will be described in further detail with reference to Examples. However, it should be understood that the present invention is by no means restricted by such specific Examples.

EXAMPLE 1

Octadecylmethylsilyl dichloride was reacted with sodium metal in toluene in accordance with a usual method to obtain a polysilane (1). The molecular weight of the polysilane was measured by gel permeation chromatography (GPC), whereby the number average molecular weight was 1810.

Five g of silica gel carrier having vinyl groups introduced (particle diameter: 5 μm, pore diameter: 12 nm) was dispersed in 10 ml of THF having 2 g of the polysilane (1) dissolved therein. Then, THF was removed by an evaporator. The silica gel carrier having the polysilane adsorbed thereon was dried at 100° C. for one hour under reduced pressure. And then, argon gas was introduced into the system, and the carrier was further heated at 250° C. for two hours. Then, heat treatment was conducted at 250° C. for 120 hours. After cooling to room temperature, the silica gel carrier was washed with THF and toluene and further with methanol and then dried at 100° C. for 24 hours.

IR spectrum of the silica gel carrier thus obtained was measured, whereby an absorption of Si—$CH_2$—Si was observed at 1355 $cm^{-1}$.

Further, $^{29}Si$ solid nuclear magnetic resonance spectrum was measured, whereby the absorption of Si—*Si—Si observed at −39.9 ppm was found to have been disappeared.

This silica gel packing material was packed in a stainless steel column having an inner diameter of 4.6 mm and a length of 150 mm, and naphthalene was measured using as an eluting solution a mixture comprising 70 parts by weight of methanol and 30 parts by weight of water, whereby the elution position was 8.43 minutes and the theoretical plate number was 12400. The elution positions and the theoretical plate numbers for other compounds are also shown in Table 1.

TABLE 1

|  | Elution position (minutes) | Theoretical plate number |
|---|---|---|
| Phenol | 2.53 | 7620 |
| Benzene | 4.72 | 9770 |
| Toluene | 6.77 | 11500 |
| Naphthalene | 8.43 | 12400 |

EXAMPLE 2

A polysilane (2) having octyl groups was prepared in the same manner as in Example 1 except that octylmethylsilyl dichloride was used instead of the octadecylmethylsilyl dichloride in Example 1. The molecular weight of this polysilane was measured by GPC whereby the number average molecular weight was 970.

Five g of silica gel having vinyl groups introduced in the same manner as in Example 1 (particle diameter: 5 μm, pore diameter: 12 nm) was dispersed in 10 ml of THF having 1.5 g of the polysilane (2) dissolved therein. Then, THF was removed by an evaporator. The silica gel carrier having the polysilane (2) adsorbed thereon, was dried at 100° C. for one hour under reduced pressure. Then, argon gas was introduced into the system, and the carrier was heated further at 250° C. for two hours. Then, heat treatment was conducted at 450° C. for 120 hours. After cooling to room temperature, the silica gel carrier was washed with THF and toluene and further with methanol and then dried at 100° C. for 24 hours.

The IR spectrum of the silica gel carrier thus obtained was measured, whereby an absorption of Si—$CH_2$—Si was observed at 1355 $cm^{-1}$; Further, $^{29}Si$ solid nuclear magnetic resonance spectrum was measured, whereby the absorption of Si—*Si—Si observed at −39.9 ppm was found to have been disappeared.

This silica gel packing material was packed in a stainless steel column in the same manner as in Example 1, and naphthalene was measured, whereby the elution position was 5.99 minutes, and the theoretical plate number was 12100. The elution positions and the theoretical plate numbers for other compounds are also shown in Table 2.

TABLE 2

|  | Elution position (minutes) | Theoretical plate number |
|---|---|---|
| Phenol | 2.35 | 6720 |
| Benzene | 3.41 | 8850 |
| Toluene | 4.25 | 10570 |
| Naphthalene | 5.99 | 12000 |

EXAMPLE 3

A polysilane (3) having phenyl groups was prepared in the same manner as in Example 1 except that phenylmethyldichlorosilane was used instead of the octadecylmethyldichlorosilane in Example 1. The molecular weight of this polysilane was measured by GPC whereby the number average molecular weight was 830.

Five g of silica gel having vinyl groups introduced in the same manner as in Example 1 was dispersed in 10 ml of THF having 1 g of the polysilane (3) dissolved therein. Then, THF was removed. The silica gel having the polysilane (3) adsorbed thereon, was dried at 100° C. for one hour. Then, the argon gas was introduced, and the silica gel was subjected to heat treatment at 200° C. for two hours and further at 450° C. for 90 hours. After cooling to room temperature, the obtained silica gel was washed with THF and toluene and further with methanol and then dried at 100° C. for 24 hours under reduced pressure.

In the solid nuclear magnetic absorption spectrum of the silica gel thereby obtained, the absorption observed at −39.9 ppm was found to have been disappeared as in Example 1.

This silica gel packing material was packed in a stainless steel column in the same manner as in Example 1, and naphthalene was measured, whereby the elution position was 4.87 minutes and the theoretical plate number was 11500. The elution positions and the shown in Table 3.

TABLE 3

|  | Elution position (minutes) | Theoretical plate number |
|---|---|---|
| Phenol | 2.22 | 6120 |
| Benzene | 2.93 | 8690 |
| Toluene | 3.86 | 10490 |
| Naphthalene | 4.87 | 11500 |

COMPARATIVE EXAMPLE 1

Five g of the same silica gel as used in Example 1 (particle diameter: 5 μm, pore diameter: 12 nm) was dispersed in 100 ml of toluene, and 2 g of octadecylmethylchlorosilane was added. The mixture was reacted at 80° C. for 3 hours. Then, the silica gel was washed with 200 ml of toluene and 200 ml of methanol and then dispersed in 100 ml of pyridine. Then, 1 ml of trimethylchlorosilane was added, and the mixture was reacted at 60° C. for 4 hours. Then, the product was washed with 200 ml of toluene and 200 ml of methanol and then dried at 80° C. for 12 hours to obtain a silica gel carrier having octadecyl groups introduced thereto.

This silica gel packing material was packed in a stainless steel column in the same manner as in Example 1, and naphthalene was measured, whereby the elution position was 9.12 minutes and the theoretical plate number was 11300.

COMPARATIVE EXAMPLE 2

A packing material having octyl groups introduced to silica gel was prepared in the same manner as in Comparative Example 1 except that 2 g of octyldimethylchlorosilane was used instead of the octadecyldimethylchlorosilane in Comparative Example 1.

This silica gel packing material was packed in a stainless steel column in the same manner as in Example 1, and naphthalene was measured, whereby the elution position was 6.86 minutes, and the theoretical plate number was 11500.

COMPARATIVE EXAMPLE 3

A packing material having phenyl groups introduced to silica gel was prepared in the same manner as in Comparative Example 1 except that 1.5 g of phenyldimethylchlorosilane was used instead of the octadecyldimethylchlorosilane in Comparative Example 1.

This silica gel packing material was packed in a stainless steel column in the same manner as in Example 1, and naphthalene was measured, whereby the elution position was 5.04 minutes, and the theoretical plate number was 11200.

TEST EXAMPLE FOR ALKALI RESISTANCE

Using the silica gel packing materials obtained in the Examples and Comparative Examples and commercially available packing materials for reversed phase chromatography, an eluting solution comprising 70 parts by weight of methanol and 30 parts by weight of a 50 mM boric acid buffer solution (pH: 11.0) was passed at a flow rate of 1 ml per minute, and naphthalene was injected at predetermined intervals, whereby the elution positions and the theoretical plate numbers were investigated.

The deterioration time of the column is the time when the elution position was quickened 10% as compared with the initial elution position. The results are shown in Table 4.

TABLE 4

|  | Deterioration time |
|---|---|
| Packing material of Example 1 | 256 |
| Packing material of Example 2 | 203 |
| Packing material of Example 3 | 185 |
| Packing material of Comparative Example 1 | 77 |
| Packing material of Comparative Example 2 | 52 |
| Packing material of Comparative Example 3 | 46 |
| Commercial packing material by Company A (C$_{18}$ type) | 70 |
| Commercial packing material by Company B (C$_{18}$ type) | 35 |
| Commercial packing material by Company C (C$_8$ type) | 30 |
| Commercial packing material by Company D (phenyl type) | 45 |

From the foregoing, it is evident that the packaging materials for reversed phase chromatography having polycarbosilane introduced to silica gel have the durability improved over the packing materials prepared by the conventional silane treating agents, and yet they have adequate column efficiency.

We claim:

1. A packing material for reversed phase chromatography, which comprises silica gel with its surface coated with repeating units of a polycarbosilane of the formula (I):

wherein $R_1$ is an octyl group, an octadecyl group or a phenyl group, $R_2$ is a methyl group or a methylene group, and n is a positive integer, wherein the silica gel has pores having a pore size of from 20 to 10,000 Å.

2. The packing material for reversed phase chromatography according to claim 1, wherein $R_2$ of the polycarbosilane of the formula (I) is a methyl group.

3. A process for preparing a packing material for reversed phase chromatography as defined in claim 1, which comprises treating a polysilane coated on silica atmosphere, so as to convert the polysilane to polycarbosilane, wherein he silica gel has pores having a pore size of from 20 to 10,000 Å.

4. The process according to claim 3, wherein the polysilane is a linear polysilane of the formula (II):

wherein $R_3$ is an octyl group, an octadecyl group or a phenyl group, and m is a positive integer.

5. The process according to claim 3, wherein the polysilane is a cyclic polysilane of the formula (III):

wherein $R_3$ is an octyl group, an octadecyl group or a phenyl group, and l is a positive integer.

6. The process according to claim 3, wherein the inert atmosphere is nitrogen, helium or argon.

* * * * *